US008833807B2

(12) United States Patent
Liu et al.

(10) Patent No.: US 8,833,807 B2
(45) Date of Patent: Sep. 16, 2014

(54) DETACHABLE COMBINING DEVICE

(75) Inventors: Shih-Ing Liu, New Taipei (TW);
Kuang-Hung Chen, New Taipei (TW)

(73) Assignee: Wistron Corporation, Hsichih, New Taipei (TW)

(*) Notice: Subject to any disclaimer, the term of this patent is extended or adjusted under 35 U.S.C. 154(b) by 405 days.

(21) Appl. No.: 13/253,992

(22) Filed: Oct. 6, 2011

(65) Prior Publication Data
US 2013/0002111 A1    Jan. 3, 2013

(30) Foreign Application Priority Data
Jun. 29, 2011   (TW) .............................. 100122849 A (51) Int. Cl.
E05C 3/02        (2006.01)
G06F 1/16        (2006.01)

(52) U.S. Cl.
CPC ............ G06F 1/1656 (2013.01); G06F 1/1679 (2013.01)
USPC ........................................ 292/194; 292/213

(58) Field of Classification Search
USPC ........................ 292/194, 213, 214
See application file for complete search history.

(56) References Cited

U.S. PATENT DOCUMENTS

| | | | |
|---|---|---|---|
| 7,164,578 B2 * | 1/2007 | Wang et al. | 361/679.08 |
| 7,234,735 B2 * | 6/2007 | Harada | 292/170 |
| 7,570,485 B2 * | 8/2009 | Krah | 361/679.23 |

FOREIGN PATENT DOCUMENTS

TW            M312853          5/2007

* cited by examiner

*Primary Examiner* — Mark Williams
(74) *Attorney, Agent, or Firm* — Winston Hsu; Scott Margo (57) ABSTRACT

A detachable combining device for covering an electronic module is disclosed in the present invention. The detachable combining device includes a first casing having an engaging portion, a second casing, a buckling component pivotably disposed on the second casing, and a latch slidably disposed on the second casing. The buckling component buckles the engaging portion of the first casing, so as to constrain movement between the first casing and the second casing. The latch is for sliding relative to the second casing along a first direction to move the buckling component, so that the buckling component pivots relative to the second casing for disassembling from the engaging portion.

13 Claims, 8 Drawing Sheets

DETACHABLE COMBINING DEVICE

BACKGROUND OF THE INVENTION

1. Field of the Invention

The present invention relates to a combining device, and more particularly, to a detachable combining device without screws for rapid assembly.

2. Description of the Prior Art

Generally, modules of an electronic device, such as the panel module and the host module, are respectively combined with detachable casings, so that the electronic components, such as a display panel, a hard disk, an optical disk, a circuit board and so on, can be disposed inside the modules for protection. For example, an upper housing and a low housing of the conventional notebook computer can be respectively for covering the panel module and the host module, and the upper housing and the low housing can respectively be a structure combined with two casings. However, a plurality of buckling components, sliding components and latches are utilized for tightly connecting the two casings in the conventional notebook computer, so that a huge structural space is necessary to be designed inside the housing for accommodating the buckling components, the sliding components and the latches. In addition, structural disposition and operation of the conventional casings are complicated due to an assembly of the buckling components, the sliding components and the latches. The conventional casings can not be assembled or disassembled rapidly and conveniently. Therefore, design of a combining device has advantages of simple structure, easy operation and preferable combining strength is an important issue of the computer industry.

SUMMARY OF THE INVENTION

The present invention provides a detachable combining device without screws for rapid assembly for solving above drawbacks.

According to the claimed invention, a detachable combining device includes a first casing, a second casing, and a buckling component pivotably disposed on the second casing. The first casing includes an engaging portion, and the buckling component is for buckling the engaging portion of the first casing, so as to constrain a movement between the first casing and the second casing. The detachable combining device further includes a latch slidably disposed on the second casing for sliding relative to the second casing along a first direction to move the buckling component, so that the buckling component pivots relative to the second casing for disassembling from the engaging portion.

According to the claimed invention, the buckling component includes an inclined structure, and the engaging portion slides relative to the inclined structure for pivoting the engaging portion relative to the second casing.

According to the claimed invention, the buckling component is a T-shaped structure, and the inclined structure is disposed on top of an engaging part of the T-shaped structure.

According to the claimed invention, the detachable combining device further includes a resilient component disposed between the latch and the second casing for sliding the latch relative to the second casing along a direction opposite to the first direction.

According to the claimed invention, the detachable combining device further includes a torsional spring disposed on the buckling component and connected to the second casing for engaging the buckling component with the engaging portion.

According to the claimed invention, the first casing includes a guiding block, the latch includes a guiding structure, and the guiding structure is for sliding relative to the guiding block when the lath slides relative to the second casing, so as to move the first casing.

According to the claimed invention, the latch further includes a main body, two protrusions disposed on two ends of the main body for pushing the buckling component, and the guiding structure is disposed on a middle of the main body.

According to the claimed invention, the latch includes pressing portion.

According to the claimed invention, the first casing further includes a first jointing structure, the second casing includes a second jointing structure, and a tenon of the first jointing structure is engaged with a sunken part of the second jointing structure.

According to the claimed invention, an engaging slot is further formed on the second jointing structure, and the engaging portion of the first casing is engaged inside the engaging slot.

According to the claimed invention, the first jointing structure is integrated with the engaging portion.

According to the claimed invention, the first jointing structure is a polygonal structure, and the second jointing structure is a circular structure.

According to the claimed invention, the tenon is disposed on an edge of the polygonal structure.

According to the claimed invention, the latch further includes a constraining portion, a constraining slot is formed on a surface of the second casing, and the latch slides relative to the second casing via the constraining portion and the constraining slot.

The detachable combining device of the present invention has simple structure, so as to economize the internal space of the detachable combining device effectively and to decrease noise due to assembly and disassembly. In addition, the detachable combining device of the present invention has the idle proof function for assembling the first casing with the second casing correctly, and can stand the first casing when the buckling component is unlocked, so as to separate the first casing from the second casing rapidly and conveniently. Thus, the present invention has advantages of easy operation and convenient utilization.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
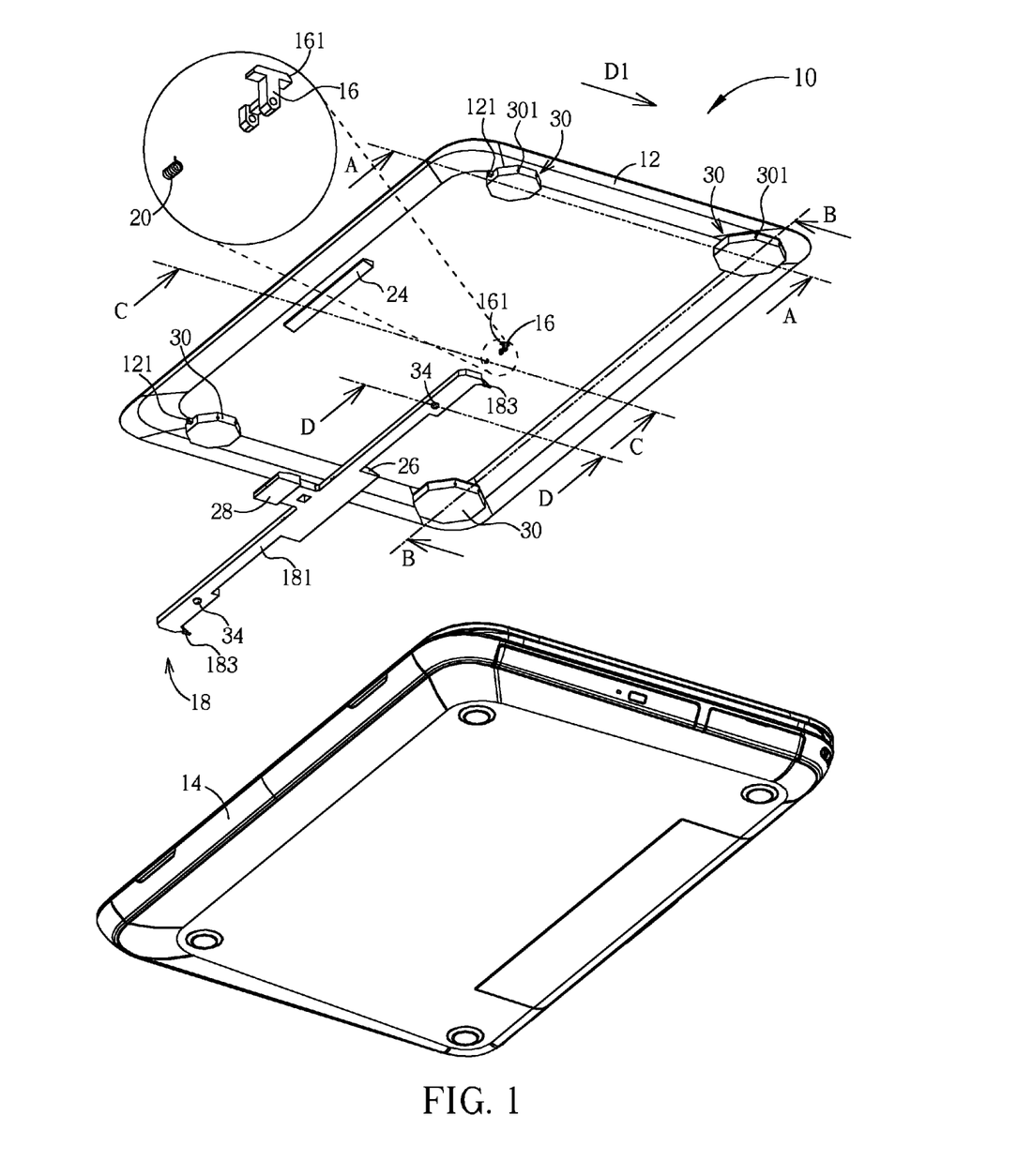
FIG. 1 and FIG. 2 are exploded diagrams of a detachable combining device in different views according to an embodiment of the present invention.
Figure 2:
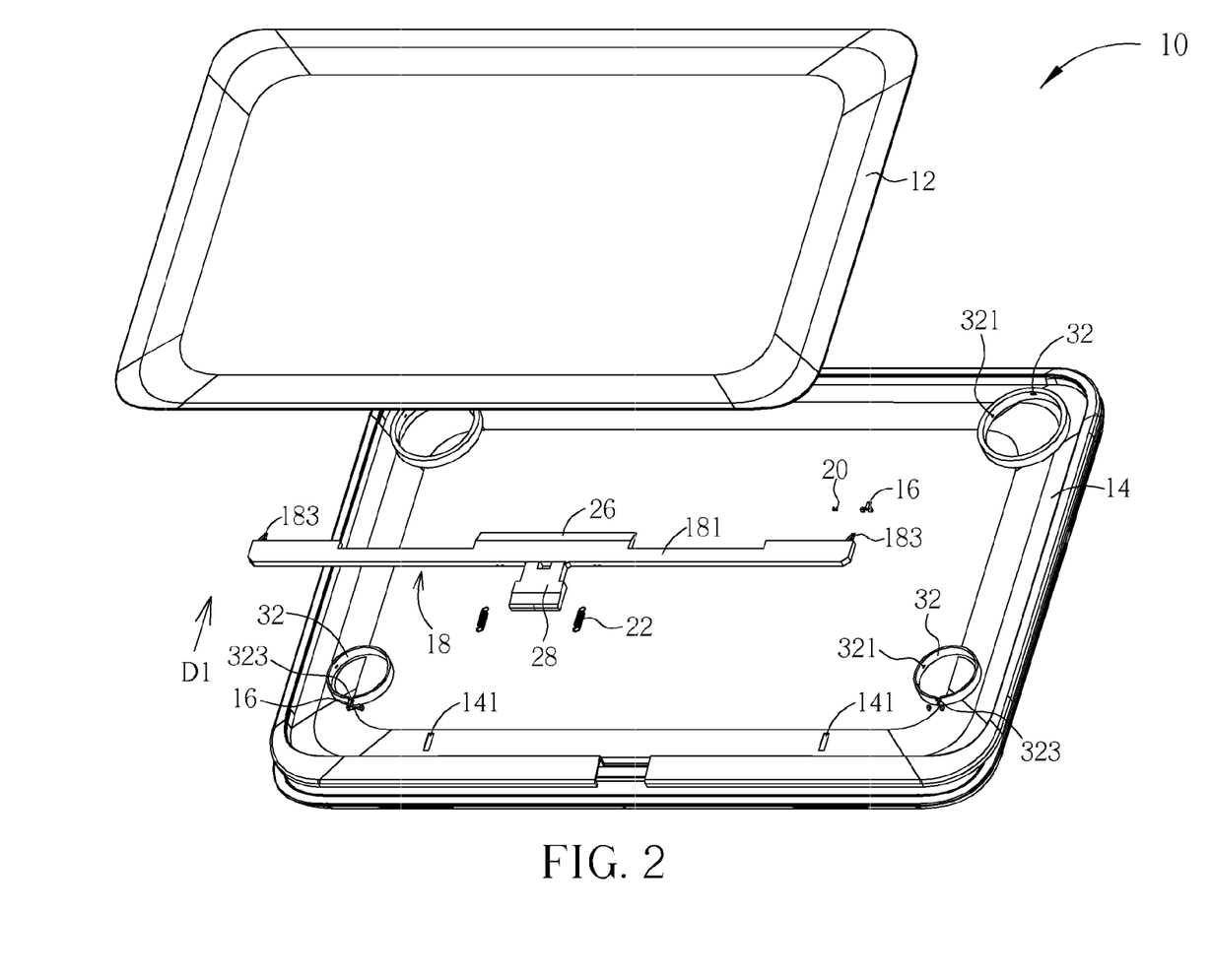

Please refer to FIG. 1 and FIG. 2. FIG. 1 and FIG. 2 are exploded diagrams of a detachable combining device 10 in different views according to an embodiment of the present invention. The detachable combining device 10 includes a first casing 12 and a second casing 14. The first casing 12 includes two engaging portions 121. The first casing 12 and the second casing 14 are for covering an electronic module. For example, the first casing 12 and the second casing 14 of the detachable combining device 10 of the present invention can cover a panel module or a host module of the notebook computer for protection. The detachable combining device 10 further includes two buckling components 16 pivotably disposed on the second casing 14. As shown in FIG. 1 and FIG. 2, the buckling component 16 can be a T-shaped structure, and the T-shaped structure includes a supporting part and an engaging part. The buckling component 16 can pivot to the second casing 14 via the supporting part, and be fixed on the first casing 12 via the engaging part. Therefore, each buckling component 16 is for engaging with the corresponding engaging portion 121 of the first casing 12, so as to constrain a movement between the first casing 12 and the second casing 14.

In addition, the buckling component 16 can include an inclined structure 161 disposed on top of the engaging part. When the engaging portion 121 slides relative to the inclined structure 161, the buckling component 16 can pivot relative to the second casing 14 and be far away from the first casing 12 by the engaging portion 121, so as to prevent the first casing 12 and the second casing 14 from disassembly due to structural interference. The detachable combining device 10 further includes a latch 18 slidably disposed on the second casing 14. The latch 18 can include a main body 181, and two protrusions 183 disposed on two edges of the main body 181. The latch 18 can slide relative to the second casing 14 along a first direction D1 for driving the two protrusions 183 to pivot the buckling components 16 relative to the second casing 14, so as to separate the buckling component 16 from the engaging portion 121.

The detachable combining device 10 can further include two torsional springs 20 respectively disposed on the corresponding buckling component 16 and connected to the second casing 14. Each torsional spring 20 can provide a resilient recovering force for pivoting the buckling component 16 relative to the second casing 14, so as to engage the buckling component 16 with the engaging portion 121 of the first casing 12. The detachable combining device 10 can further include at least one resilient component 22, such as a stretching spring. The resilient component 22 can be disposed between the latch 18 and the second casing 14 for sliding the latch 18 relative to the second casing 14 along a direction opposite to the first direction D1, so as to recover the latch 18 to an initial position. The first casing 12 can include a guiding block 24, and the latch 18 can include a guiding structure 26 disposed on the middle of the main body 181. When the latch 18 slides relative to the second casing 14, the guiding structure 26 slides relative to the guiding block 24 for adjusting a distance between the first casing 12 and the second casing 14, such as pushing the first casing 12 away from the second casing 14 for separating the first casing 12 from the second casing 14. In addition, the latch 18 can include a pressing portion 28 disposed on the middle of the main body 181. The pressing portion 28 can be pushed or pulled for adjusting a position of the latch 18 relative to the second casing 14. Because the pressing portion 28 is disposed on the middle of the main body 181, the main body 181 can uniformly drive the two protrusions 183 to pivot the corresponding buckling component 16 relative to the second casing 14.

For increasing structural stability of an assembly of the first casing 12 and the second casing 14, as shown in FIG. 1 and FIG. 2, the first casing 14 can further include four first jointing structures 30, and the second casing 14 can include four second jointing structures 32. Generally, the first jointing structures 30 can be respectively disposed on four edges of the first casing 12. The second jointing structures 32 can be respectively disposed on four edges of the second casing 14, and position of each second jointing structure 32 can be designed according to the corresponding first jointing structure 30. In the embodiment of the present invention, the first jointing structure 30 can be a polygonal structure, such as an octagon structure. The second jointing structure 32 can be a circular structure, and the polygonal structure can be engaged inside the circular structure in a internally tangent manner. Each first jointing structure 30 can include a plurality of tenons 301 disposed on edges of adjacent lateral surfaces of the polygonal structure. An amount of the tenon 301 corresponds to a shape of the polygonal structure, and depends on design demand. The plurality of tenons 301 can be for engaging inside the corresponding sunken part 321 on the second jointing structure 32 when the first jointing structure 30 is combined with the second jointing structure 32. An assembly of the tenon 301 and the sunken part 321 can be applied for idle proof function. Further, when the first casing 12 is combined with the second casing 14, vibration and sound can be generated due to the assembly of the tenon 301 and the sunken part 321, so as to ensure correct operation of the detachable combining device 10.

It should be mentioned that the two engaging portions 121 of the first casing 12 can respectively be connected to the corresponding first jointing structure 30, and an engaging slot 323 can be further formed on the second jointing structure 32 at a position corresponding to the engaging portions 121 of the first jointing structure 30. When the first jointing structure 30 is engaged with the second jointing structure 32, the engaging portions 121 of the first casing 12 can be simultaneously engaged with the corresponding engaging slot 323 on the second jointing structure 32. The latch 18 can further include a constraining portion 34, and a constraining slot 141 can be formed on an inner surface of the second casing 14. Therefore, the latch 18 can slide on the second casing 14 via an assembly of the constraining portion 34 and the constraining slot 141, so as to correctly slide the latch 18 relative to the second casing 14 along the predetermined track.

Figure 3:
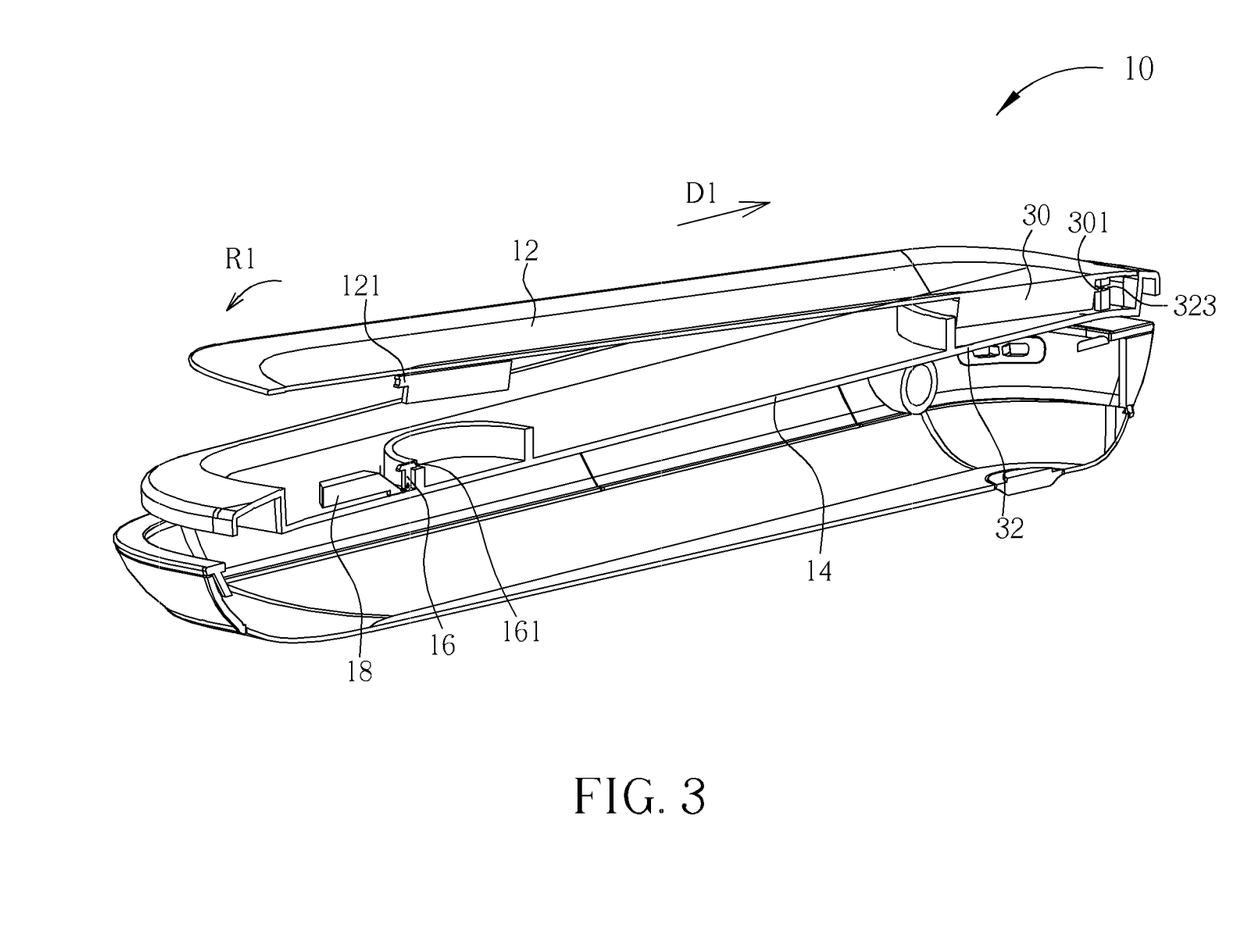
FIG. 3 and FIG. 4 are sectional views of the detachable combining device in different modes along A-A line in FIG. 1 according to the embodiment of the present invention.
Figure 4:
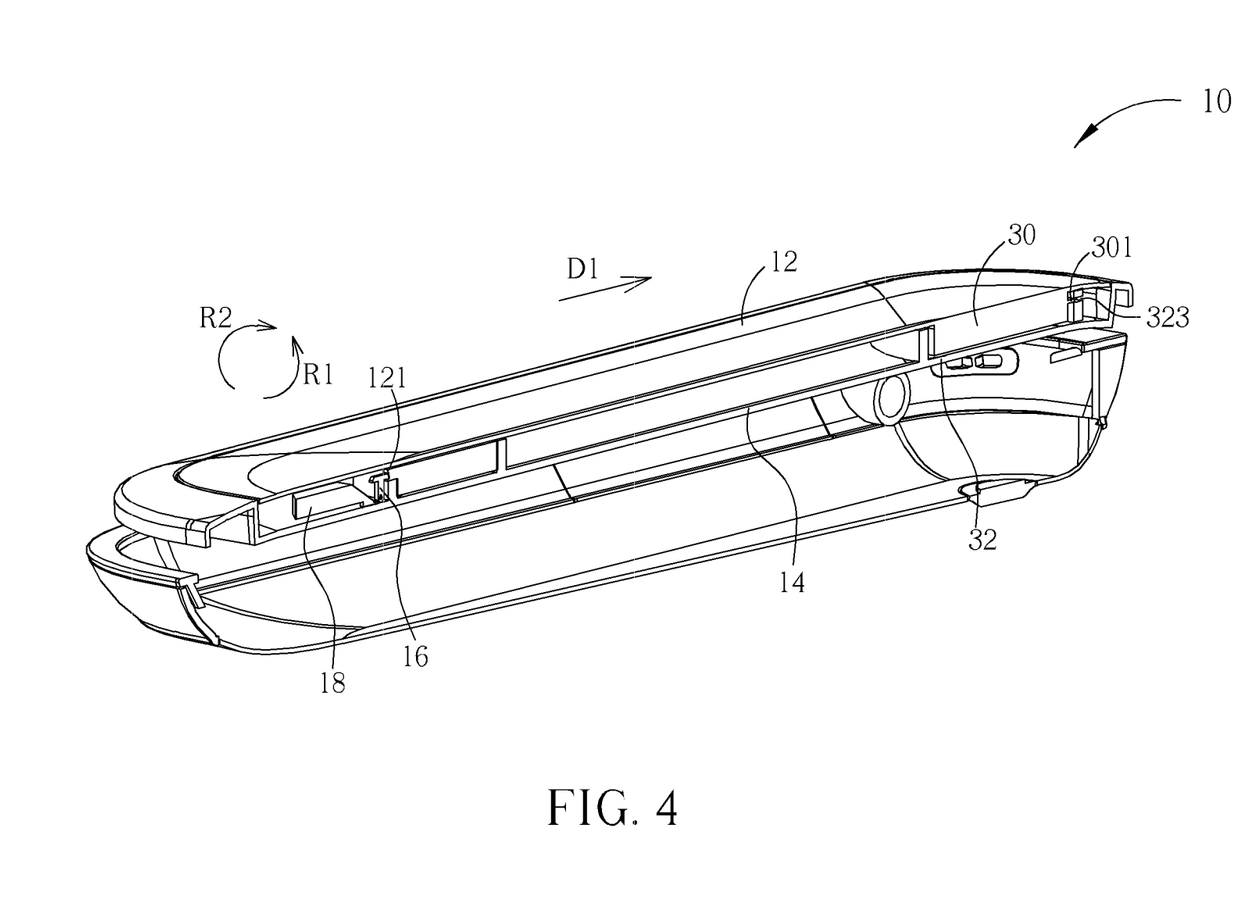

Please refer to FIG. 1 to FIG. 4. FIG. 3 and FIG. 4 are sectional views of the detachable combining device 10 in different modes along A-A line in FIG. 1 according to the embodiment of the present invention. As shown in FIG. 3, the first casing 12 can obliquely insert into the second casing 14, and one of the tenons 301 (such as a fixing tenon) of the first jointing structure 30 of the first casing 12 can be partly engaged inside the sunken part 321 on the second jointing structure 32 of the second casing 14 for setting relative position of the first casing 12 and the second casing 14. Meanwhile, the engaging portion 121 of the first casing 12 slides relative to the inclined structure 161 of the buckling component 16, so as to pivot the buckling component 16 relative to the second casing 14 along a counterclockwise direction R1. At the same time, the torsional spring 20 is deformed for storing the resilient recovering force. Then, as shown in FIG.

4, when the first casing 12 is combined with the second casing 14, the tenons 301 (such as the positioning tenon) of the first jointing structure 30 can be respectively engaged inside the corresponding sunken part 321 completely for fixing the relative position of the first casing 12 and the second casing 14. When the buckling component 16 separates from the engaging portions 121, the buckling component 16 can pivot relative to the second casing 14 along a clockwise direction R2 by the resilient recovering force of the torsional spring 20, so as to engage with the engaging portion 121. Thus, the detachable combining device 10 of the present invention can stably combine the first casing 12 with the second casing 14 via the tight fit assembly of the tenon and the sunken part, and the assembly of the buckling component 16 and the engaging portion 121 for protecting internal covered electronic module.

Figure 5:
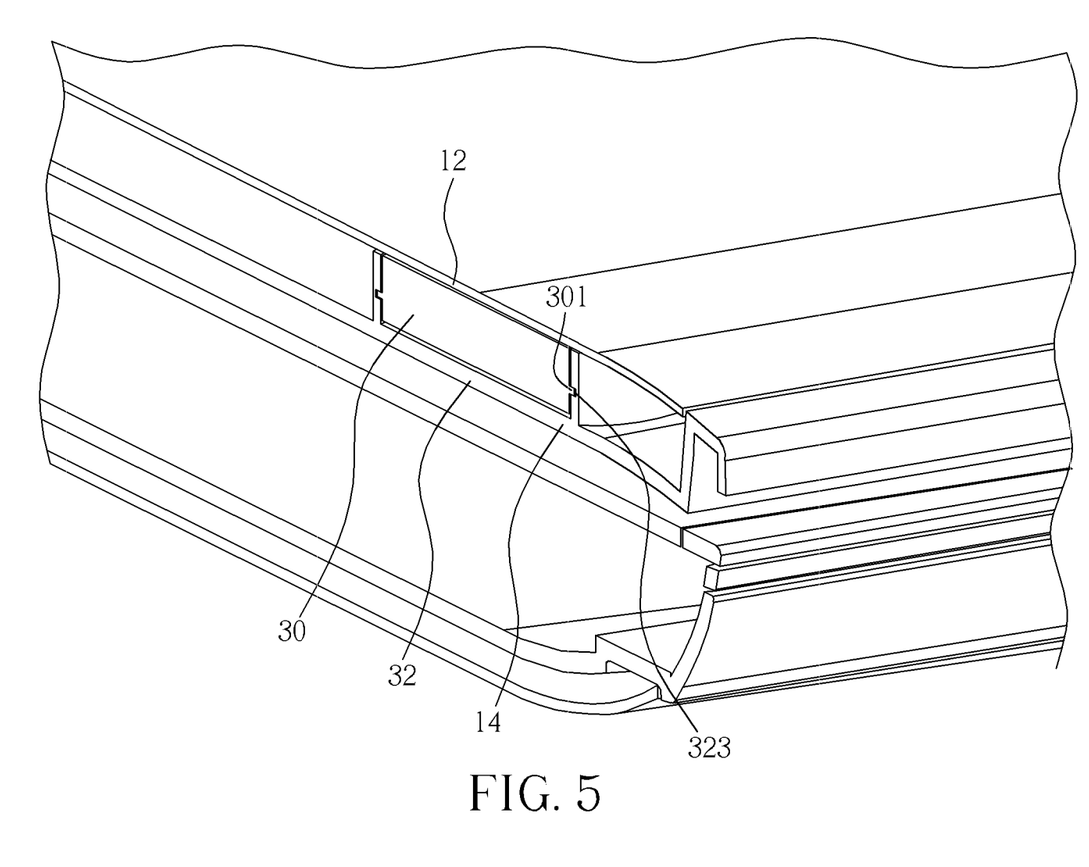
FIG. 5 is a sectional view of the detachable combining device along B-B line in FIG. 1 according to the embodiment of the present invention.

Please refer to FIG. 5. FIG. 5 is a sectional view of the detachable combining device 10 along B-B line in FIG. 1 according to the embodiment of the present invention. As shown in FIG. 5, when the first casing 12 is combined with the second casing 14, each tenon 301 of the first jointing structure 30 can insert into the corresponding sunken part 321 on the second jointing structure 32. The first casing 12 can be fixed on the second casing 14 by the assembly of the tenon 301 and the sunken part 321. In addition, the vibration and sound generated due to the assembly of the tenon 301 and the sunken part 321 can be for the idle proof function, so as to correctly combine the first casing 12 with the second casing 14.

Figure 6:
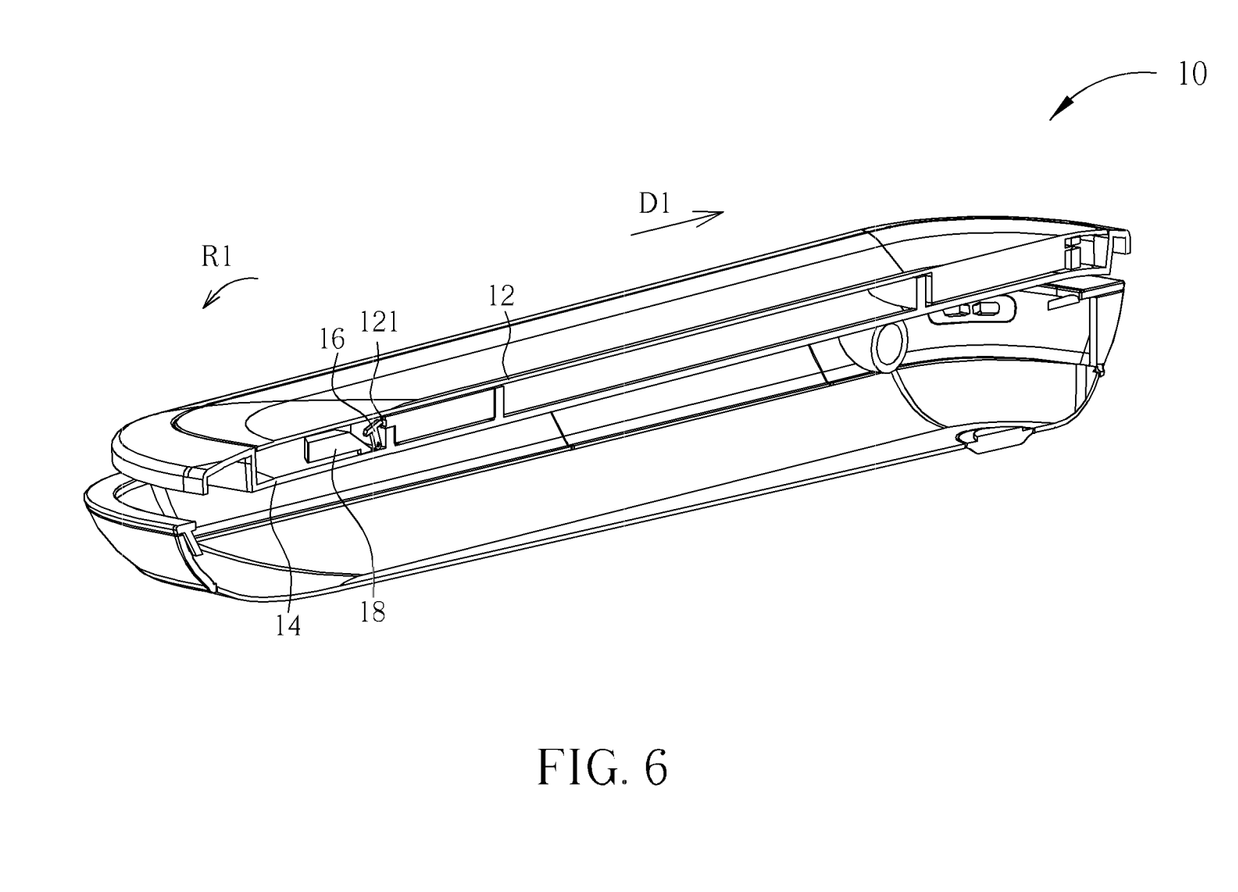
FIG. 6 is a sectional view of the detachable combining device along A-A line in FIG. 1 according to the embodiment of the present invention.
Figure 7:
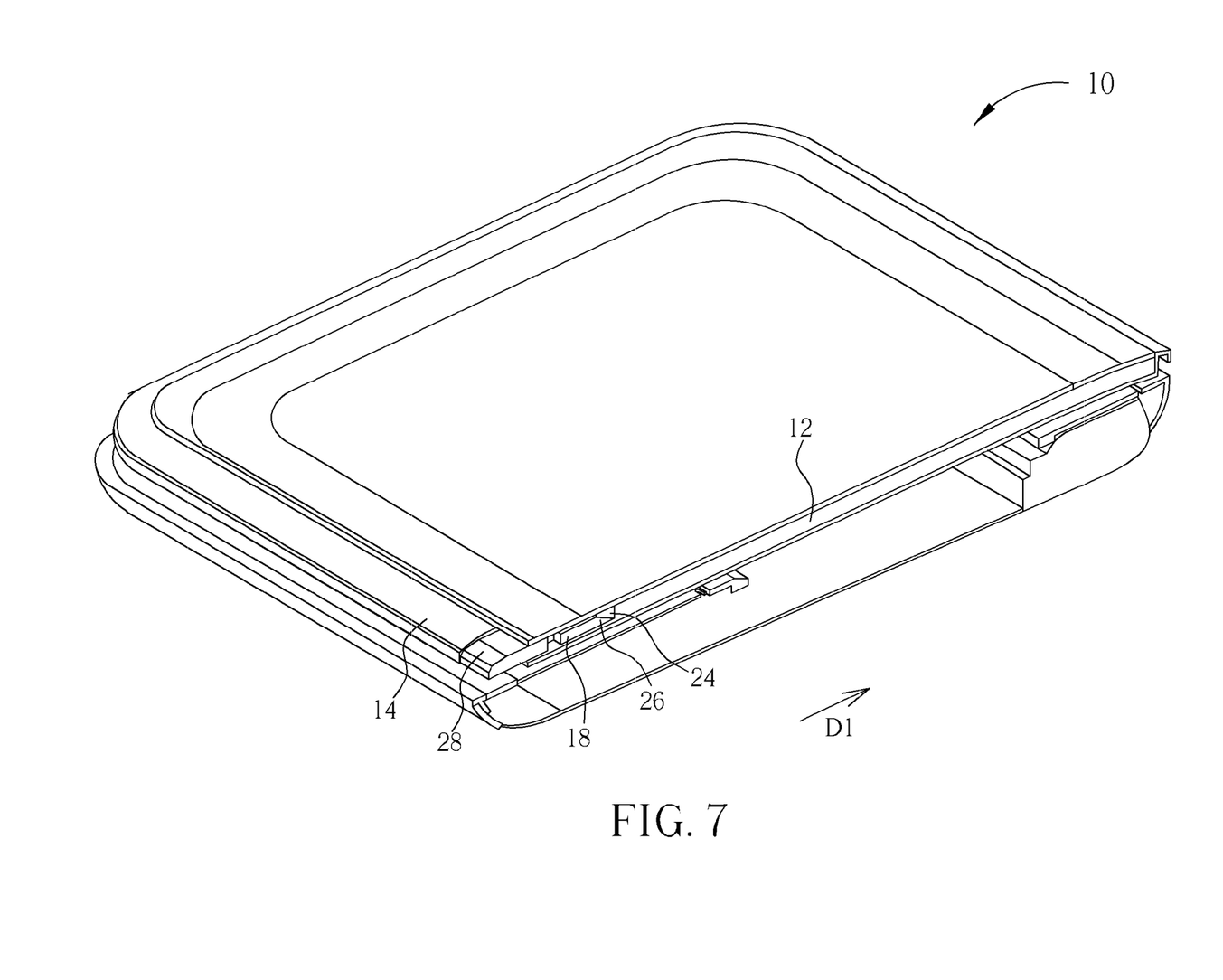
FIG. 7 is a sectional view of the detachable combining device along C-C line in FIG. 1 according to the embodiment of the present invention.
Figure 8:
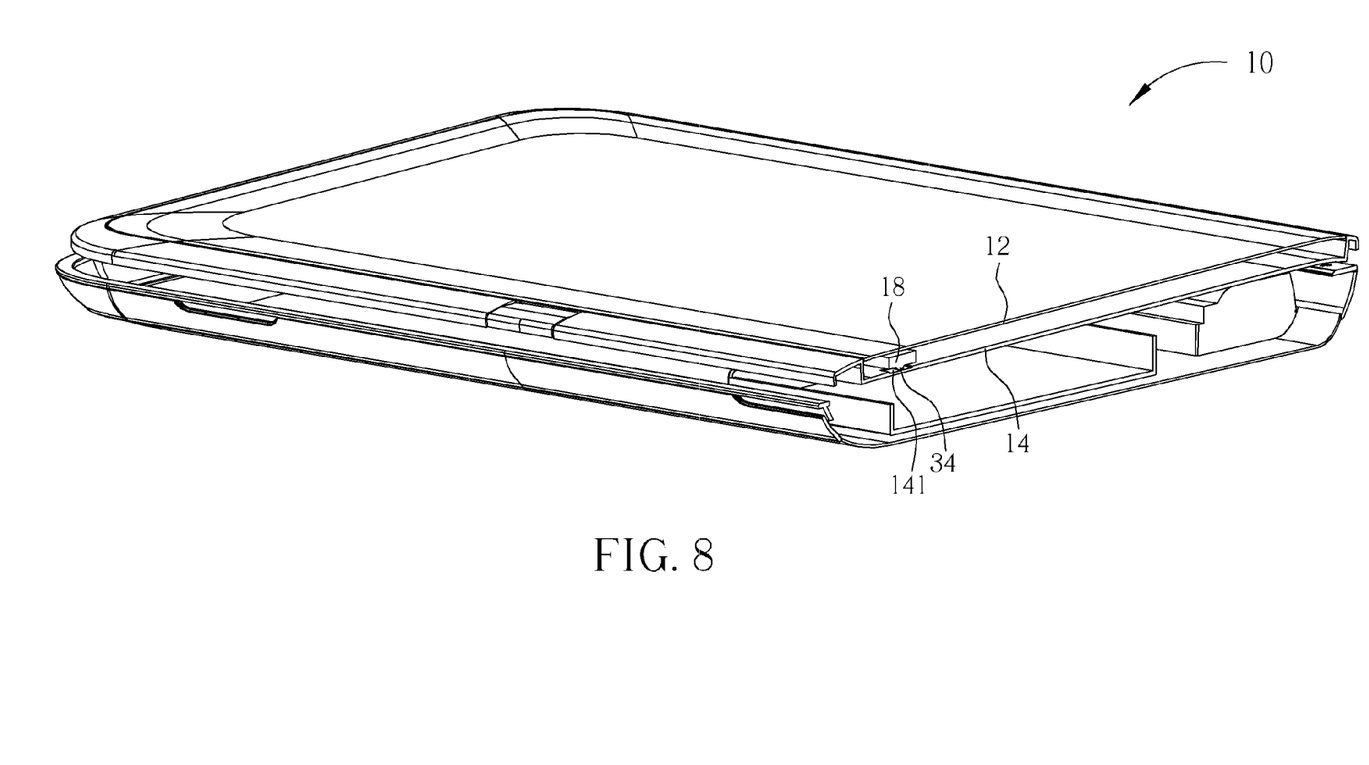
FIG. 8 is a sectional view of the detachable combining device along D-D line in FIG. 1 according to the embodiment of the present invention.

On the other hand, the first casing 12 can separate from the second casing 14 by the latch 18. Please refer to FIG. 4, FIG. 6 and FIG. 7. FIG. 6 is a sectional view of the detachable combining device 10 along A-A line in FIG. 1 according to the embodiment of the present invention. FIG. 7 is a sectional view of the detachable combining device 10 along C-C line in FIG. 1 according to the embodiment of the present invention. The pressing portion 28 can be pushed for moving the latch 18 relative to the second casing 14 along the first direction D1 for separating the first casing 12 from the second casing 14. As shown in FIG. 6, the latch 18 can rotate the buckling component 16 along the counterclockwise direction R1, so as to separate the engaging part of the buckling component 16 from the engaging portion 121 of the first casing 12. As shown in FIG. 7, the guiding structure 26 of the latch 18 can slide relative to the guiding block 24 of the first casing 12 along the first direction D1 by the pressing portion 28 for standing the first casing 12. Meanwhile, each tenon 301 of the first jointing structure 30 can separate from the corresponding sunken part 321 on the second jointing structure 32 for disassembling the first casing 12 from the second casing 14. In addition, please refer to FIG. 8. FIG. 8 is a sectional view of the detachable combining device 10 along D-D line in FIG. 1 according to the embodiment of the present invention. As shown in FIG. 8, the constraining portion 34 of the latch 18 can move along the constraining slot 141 on the second casing 14 for increasing operating stability of the detachable combining device 10.

In conclusion, the detachable combining device of the present invention can include the latch having the plurality of constraining portions, so that the latch can move relative to the second casing stably via the assembly of the constraining portion and the constraining slot. The slide of the latch relative to the second casing of the present invention can be for controlling the buckling component to assemble with or disassemble from the engaging portion of the first casing. When the buckling component separates from the engaging portion by the latch, the guiding structure of the latch can slide relative to the guiding block for standing the first casing. The first casing can be away from the second casing automatically when constraint of the buckling component and the engaging portion is unlocked, so that the present invention can economize operating period and increase operating convenience effectively. The present invention can further utilize the tight fit assembly of the first jointing structure and the second jointing structure to increase the structural stability of the first casing and the second casing. The first jointing structure can be the polygonal structure having the tenons, the second jointing structure can be the circular structure having sunken parts, and the first jointing structure can be disposed inside the second jointing structure in the internally tangent manner for engaging the tenon inside the corresponding sunken part, so as to combine the first casing with the second casing. Furthermore, the engaging portion of the first casing can be integrated with the first jointing structure. The engaging portion can be disposed inside the engaging slot on the second jointing structure when the first jointing structure is combined with the second jointing structure, so that the assembly of the buckling component and the engaging portion can constrain the relative movement of the first jointing structure and the second jointing structure for economizing internal space of the detachable combining device of the present invention.

Comparing to the prior art, the detachable combining device of the present invention has simple structure, so as to economize the internal space of the detachable combining device effectively and to decrease noise due to assembly and disassembly. In addition, the detachable combining device of the present invention has the idle proof function for assembling the first casing with the second casing correctly, and can stand the first casing when the buckling component is unlocked, so as to separate the first casing from the second casing rapidly and conveniently. Thus, the present invention has advantages of easy operation and convenient utilization.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A detachable combining device comprising:
  a first casing comprising an engaging portion and a guiding block;
  a second casing;
  a buckling component pivotably disposed on the second casing for buckling the engaging portion of the first casing, so as to constrain a movement between the first casing and the second casing; and
  a latch slidably disposed on the second casing for sliding relative to the second casing along a first direction to move the buckling component, so that the buckling component pivots relative to the second casing for disassembling from the engaging portion, the latch comprising a guiding structure, and the guiding structure slidably pushing the guiding block to separate the first casing from the second casing when the latch slides relative to the second casing.

2. The detachable combining device of claim 1, wherein the buckling component comprises an inclined structure, the engaging portion slides relative to the inclined structure for pivoting the engaging portion relative to the second casing.

3. The detachable combining device of claim 2, wherein the buckling component is a T-shaped structure, and the inclined structure is disposed on top of an engaging part of the T-shaped structure.

4. The detachable combining device of claim 1, further comprising:

a torsional spring disposed on the buckling component and connected to the second casing for engaging the buckling component with the engaging portion.

5. The detachable combining device of claim 1, further comprising:
a resilient component disposed between the latch and the second casing for sliding the latch relative to the second casing along a direction opposite to the first direction.

6. The detachable combining device of claim 1, wherein the latch further comprises a main body, two protrusions disposed on two ends of the main body for pushing the buckling component, and the guiding structure is disposed on a middle of the main body.

7. The detachable combining device of claim 1, wherein the latch comprises pressing portion.

8. The detachable combining device of claim 1, wherein the first casing further comprises a first jointing structure, the second casing comprises a second jointing structure, and a tenon of the first jointing structure is engaged with a sunken part of the second jointing structure.

9. The detachable combining device of claim 8, wherein an engaging slot is further formed on the second jointing structure, and the engaging portion of the first casing is engaged inside the engaging slot.

10. The detachable combining device of claim 8, wherein the first jointing structure is integrated with the engaging portion.

11. The detachable combining device of claim 8, wherein the first jointing structure is a polygonal structure, and the second jointing structure is a circular structure.

12. The detachable combining device of claim 11, wherein the tenon is disposed on an edge of the polygonal structure.

13. The detachable combining device of claim 1, wherein the latch further comprises a constraining portion, a constraining slot is formed on a surface of the second casing, and the latch slides relative to the second casing via the constraining portion and the constraining slot.

* * * * *